United States Patent
Tremblay et al.

(10) Patent No.: US 6,542,990 B1
(45) Date of Patent: *Apr. 1, 2003

(54) ARRAY ACCESS BOUNDARY CHECK BY EXECUTING BNDCHK INSTRUCTION WITH COMPARISON SPECIFIERS

(75) Inventors: Marc Tremblay, Menlo Park, CA (US); James Michael O'Connor, Union City, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/118,388

(22) Filed: Apr. 8, 2002

Related U.S. Application Data

(63) Continuation of application No. 09/565,625, filed on May 4, 2000, now Pat. No. 6,408,383.

(51) Int. Cl.[7] .............................................. G06F 12/06
(52) U.S. Cl. ..................... 712/227; 711/152; 711/171; 712/208; 712/225
(58) Field of Search ............................... 711/152, 171; 712/225, 227, 208

(56) References Cited

U.S. PATENT DOCUMENTS

| | | | | |
|---|---|---|---|---|
| 4,760,374 A | * | 7/1988 | Moller ..................... | 340/146.2 |
| 5,568,624 A | | 10/1996 | Sites et al. ............... | 712/223 |
| 5,878,245 A | | 3/1999 | Johnson et al. .......... | 711/154 |
| 6,014,723 A | * | 1/2000 | Tremblay et al. ........ | 711/1 |
| 6,185,673 B1 | * | 2/2001 | Dewan ..................... | 712/223 |
| 6,298,365 B1 | * | 10/2001 | Dubey et al. ............ | 340/146.2 |
| 2002/0029332 A1 | * | 3/2002 | Saulsbury ................. | 712/225 |

OTHER PUBLICATIONS

Marc Tremblay and William Joy; *A Multiple-Thread Processor For Threaded Software Applications*: U.S. Ser. No.: 09/204,480; Filed Dec. 3, 1998; 33 pages of Specification (including claims and Abstract); and 10 Sheets of Formal Drawings. (Copy Enclosed).

Linley Gwenap; "MAJC Gives VLIW A New Twist;" *Microprocessor Report: The Insider's Guide To Microprocessor Hardware*; vol. 13, No. 12; Sep. 13, 1999; 5 pages. (Copy Enclosed).

* cited by examiner

*Primary Examiner*—Kenneth S. Kim
(74) *Attorney, Agent, or Firm*—Zagorin, O'Brien & Graham, LLP

(57) ABSTRACT

The present invention provides a method and apparatus for executing a boundary check instruction that provides accelerated bound checking. The instruction can be used to determine whether an array address represents a null pointer, and whether an array index is less than zero or greater than the size of the array. Three extensions of a boundary check instruction are provided, with each performing a different combination of three boundary check comparisons. One comparison compares a first operand, which may contain the base address of an array, to zero. Another comparison evaluates the value of a second operand, which may contain an index offset, to determine if it is less than zero. The other comparison evaluates whether the value of the second operand is greater than or equal to a third operand. The third operand may indicate the size of an array. A trap is generated if any of the comparisons evaluates to true.

43 Claims, 3 Drawing Sheets

ARRAY ACCESS BOUNDARY CHECK BY EXECUTING BNDCHK INSTRUCTION WITH COMPARISON SPECIFIERS

CROSS-REFERENCE SECTION

This application is a continuation of U.S. patent application Ser. No. 09/565,625, filed May 4, 2000, and entitled, "Array Access Boundary Check By Executing BNDCHK Instruction With Comparison Specifiers," and naming Marc Tremblay and James Michael O'Connor as the inventors, now issued U.S. Pat. No. 6,408,383, the application being incorporated herein by reference in its entirety.

FIELD OF THE INVENTION

The present invention relates generally to microprocessors, and more particularly, to a boundary check acceleration instruction.

BACKGROUND

Reduced Instruction Set Computing (RISC) microprocessors are well known. RISC microprocessors are characterized by a smaller number of instructions, which are relatively simple to decode, and by requiring that all arithmetic/logic operations be performed register-to-register. RISC instructions are generally of only one length (e.g., 32-bit instructions). RISC instruction execution is of the direct hardwired type, as opposed to microcoding. There is a fixed instruction cycle time, and the instructions are defined to be relatively simple so that each instruction generally executes in one relatively short cycle.

A RISC microprocessor typically includes an instruction for accessing a data object such as an array. However, a typical array access may not be preceded by a check for a valid array access. If an array access is preceded by a check for a valid array access, it is accomplished in a typical RISC microprocessor by executing multiple conditional branches and test instructions.

A RISC microprocessor also typically provides one or more compare instructions that compare the value of two operands. However, these instructions alter the program-visible state by storing the result of the compare operation in a result register. Accordingly, when using a compare operation to determine whether boundary conditions exist, the instruction's cycle time must include the time it takes to store the result in the result register.

Speed of execution is also highly dependent on the sequentiality of the instruction stream executed by the microprocessor. Branches in the instruction stream disrupt the sequentiality of the instruction stream executed by the microprocessor and generate stalls while the prefetched instruction stream is flushed and a new instruction stream begun.

Speed of execution is also highly dependent on the number and type of program-visible changes that occur during the execution of an instruction, because such changes require additional cycle time. An instruction that can perform bound checking without changing the state of the processor would allow for speedier execution.

SUMMARY

The present invention provides a cost-effective and high-performance implementation of a boundary check instruction executed on a microprocessor. By providing the boundary check instruction, many branches can be eliminated altogether, thereby speeding up memory accesses that would otherwise require conditional branches to perform the validity checks as discussed below. Also, by eliminating unnecessary branch operations, the boundary check instruction avoids wasting entries in a limited-size hardware branch prediction table.

Moreover, in the context of bounds checking for array accesses, operation of the boundary check instruction accelerates array accesses in which the validity of each array access is checked prior to performing the array access. This robust approach to checking the validity of each array access provides for improved security features, which is desired in various environments, such as a Java™ computing environment. For example, this method can be used for various instruction sets such as Sun Microsystems, Inc.'s Majc™ instruction set.

In one embodiment, a method for boundary check acceleration includes executing a boundary check instruction. In at least one embodiment, the boundary check instruction is decoded before it is executed. Various extensions of the boundary check instruction perform various combinations of three separate comparisons. For each extension, the boundary check instruction contains the operands, or indicates the location of the operands, discussed below.

All of the extensions perform a less-than-zero comparison, evaluating whether the value of an operand, the "less-than-zero" operand, is less than zero. If so, the boundary check instruction generates a trap. For each extension, the boundary check instruction indicates the location of the less-than-zero operand. In addition to the less-than-zero comparison, each of the three extensions of the boundary check instruction performs at least one other comparison. These other comparisons are the zero-compare comparison, where the value of a "zero-compare" operand is compared with zero, and the range comparison, where it is determined whether the value of the "less-than-zero" operand is greater than or equal to the value of an upper-range operand.

When the boundary check instruction is used to perform accelerated bound checking for array accesses, the zero-compare operand is the base address of an array object, the less-than-zero operand is an index offset for an entry in the array, and the upper-range operand is a value indicating the number of entries (i.e., maximum size) in the array.

In at least one embodiment, the method of performing a boundary check instruction involves performing, in addition to the less-than-zero comparison, the range comparison. In this embodiment, the range operand either constitutes an immediate value in the boundary check instruction, or resides in the register indicated by a specifier in the boundary check instruction. The range operand is an immediate value if an immediate bit in the opcode is set. If the immediate bit in the opcode is reset, the range value resides in a register. In this embodiment, a trap is generated if the less-than zero comparison evaluates to true. A trap is also generated if the range comparison evaluates to true.

In another embodiment, executing the boundary check instruction includes performing the zero-compare comparison in addition to the less-than-zero comparison. In this embodiment, a trap is generated if the less-than zero comparison evaluates to true. A trap is also generated if the zero-compare comparison evaluates to true.

In another embodiment, executing the boundary check instruction includes performing all three of the comparisons: the zero-compare comparison, the less-than-zero comparison, and the range comparison. For each comparison, a trap is generated if the comparison evaluates to true. When this embodiment is used to perform accelerated bounds checking for array accesses, a trap will be generated if the contents of the zero-compare operand equals zero (i.e., the object pointer for the array to be accessed is a null pointer), if the value of the less-than-zero operand is less than zero (i.e., the index to be accessed is less than zero), or if the value of the less-than-zero operand is greater than or equal to the value of the range operand (i.e., the index to be accessed is greater than or equal to N, where N is the size of the array). The boundary check operation therefore results in a trap prior to the execution of an invalid array access.

Other aspects and advantages of the present invention will become apparent from the following detailed description and accompanying drawings.

DETAILED DESCRIPTION

The present invention provides boundary check acceleration for a microprocessor. In one embodiment, a boundary check instruction for a microprocessor is provided.

Figure 1:
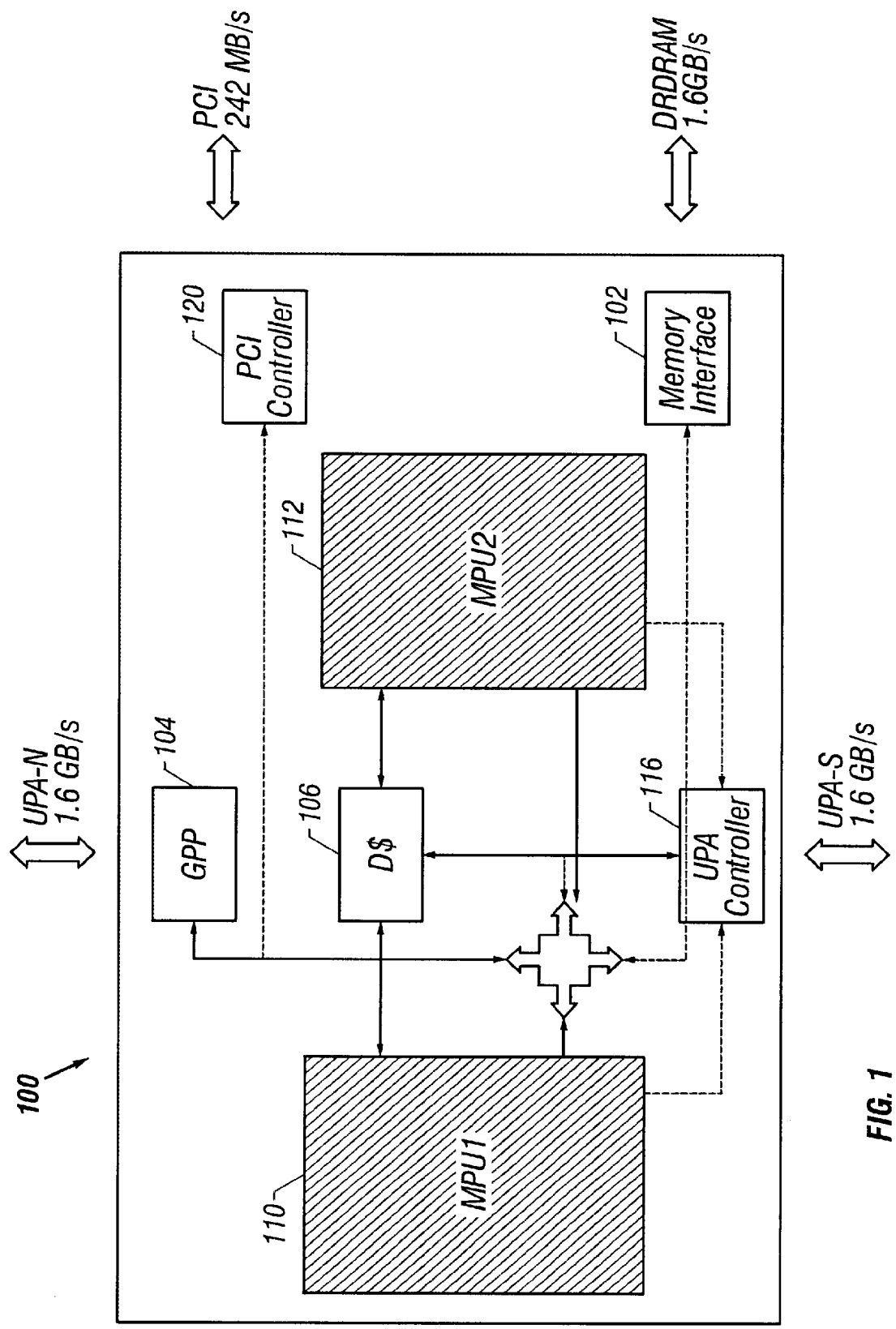
FIG. 1 is a block diagram of a microprocessor in accordance with one embodiment of the present invention.

FIG. 1 is a schematic block diagram of a microprocessor capable of executing the boundary check instruction in accordance with at least one embodiment of the present invention. FIG. 1 illustrates a processor 100 having an improved architecture for multiple-thread operation on the basis of a highly parallel structure including multiple independent parallel execution paths, shown herein as two media processing units ("MPU") 110 and 112. The execution paths execute in parallel across threads and include a multiple-instruction parallel pathway within a thread. The multiple independent parallel execution paths include functional units executing an instruction set having special data-handling instructions that are advantageous in a multiple-thread environment.

The multiple-threading architecture of the processor 100 is advantageous for usage in executing multiple-threaded applications using a language such as the Java™ language running under a multiple-threaded operating system on a multiple-threaded Java Virtual Machine™. The illustrative processor 100 includes two independent processor elements, the media processing units 110 and 112, forming two independent parallel execution paths. A language that supports multiple threads, such as the Java™ programming language generates two threads that respectively execute in the two parallel execution paths with very little overhead incurred. The special instructions executed by the multiple-threaded processor include instructions for accessing arrays, and instructions that support garbage collection.

A single integrated circuit chip implementation of a processor 100 includes a memory interface 102, a geometry decompressor 104, the two media processing units 110 and 112, a shared data cache 106, and several interface controllers. The shared data cache 106 is a dual-ported storage that is shared among the media processing units 110 and 112 with one port allocated to each media processing unit. The illustrative memory interface 102 is a direct Rambus dynamic RAM (DRDRAM) controller. The shared data cache 106 is a dual-ported storage that is shared among the media processing units 110 and 112 with one port allocated to each media processing unit. The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

The data cache 106 is four-way set associative, follows a write-back protocol, and supports hits in the fill buffer (not shown). The data cache 106 allows fast data sharing and eliminates the need for a complex, error-prone cache coherency protocol between the media processing units 110 and 112.

Figure 2:
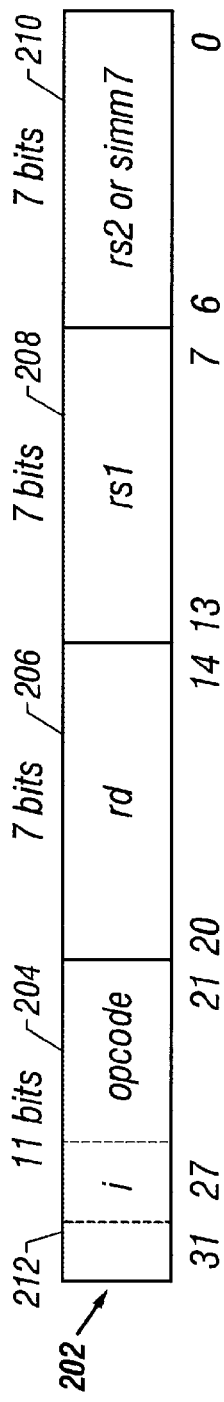
FIG. 2 shows a format of a boundary check instruction in accordance with one embodiment of the present invention.

FIG. 2 shows a format 202 of a boundary check instruction in accordance with one embodiment of the present invention. The boundary check instruction format 202 includes an 11-bit opcode field 204 in bits <31:21>, which includes an immediate bit field 212. In at least one embodiment, the immediate bit field 212 occupies bit 27 of the opcode field 204. The boundary check instruction format 202 also includes a first register specifier field, rd 206, in bits <20:14>. The rd field 206 contains a zero-compare specifier that indicates the location of a zero-compare operand, where the zero-compare operand is to be compared with zero. When the BNDCHK instruction is used to perform bounds checking for an array, the zero-compare specifier in the rd field 206 typically indicates a base address of an array. In at least one embodiment, the zero-compare specifier residing in the rd field 206 identifies a particular register. The register identified by the zero-compare specifier in the rd field 206 typically contains the base address of the array to be accessed in a subsequent memory access instruction. In another embodiment, the register identified in the rd field 206 contains a pointer address, with the pointer address containing the base address of the subject array.

FIG. 2 illustrates that the boundary check instruction format 202 also includes a second register specifier field, rs1 208, in bits <13:7>. The rs1 field 208 contains a less-than-zero specifier that indicates the location of a less-than-zero operand, where the less-than-zero operand is to be evaluated to determine if its value is less than zero. When the BNDCHK instruction is used to perform array bounds checking, the less-than-zero operand is typically an array index offset. In at least one embodiment, the less-than-zero specifier residing in the rs1 field 208 identifies a particular register. The register identified by the less-than-zero specifier in the rs1 field 208 typically contains an offset from the base address of the array to be accessed in a subsequent memory access instruction, the offset identifying a particular entry of the array to be accessed. In another embodiment, the register identified in the rs1 field 208 contains a pointer address, with the pointer address containing the index offset for the array entry.

FIG. 2 illustrates that the boundary check instruction format 202 also includes a third register/immediate specifier field 210 in bits <6:0>. The third register/immediate specifier field 210 contains an upper range specifier. The type of data in the upper range specifier corresponds to the value of the contents of the immediate bit field 212. If the value of the immediate bit ("i-bit") residing in the immediate bit field 212 is set to binary value of 1b'1', (i.e., a logic-high state)

then the upper range specifier contains a sign-extended immediate value (simm7) to be compared with the contents of the register specified by rs1 208. In contrast, if the value of the i-bit in the immediate bit field 212 is reset to a binary value of 1b'0' (i.e., a logic-low state), then the upper range specifier contains a range-operand specifier that identifies the location of an upper-range operand, where the upper-range operand is to be compared with the contents of the register specified by rs1. When the BNDCHK instruction is used to perform accelerated bound checking for array accesses, the range-operand specifier residing in the rs2 field 210 identifies a particular register. The register identified by the range-operand specifier in the rs2 field 210 typically contains a numerical value indicating the number of entries in the array to be accessed. For instance, for an array of N entries, indexed from 0 to N−1, the value in the register specified by the range-operand specifier in the rs2 field 210 is N. In another embodiment, the register identified in the rs2 field 210 contains a pointer address, with the pointer address containing a value indicating the number of entries in the subject array.

One embodiment of the assembler syntax for the BNDCHK instruction is as follows:

bndchk rs1,rs2_or_simm7,rd.

The boundary check instruction compares up to two values against certain limits, and causes an exception if either of the two values exceeds the certain limits. The boundary check instruction provides at least three extensions, with each extension performing a different combination of all or a portion of the following comparisons:

Zero Compare: Comparing the value of the contents of the register specified by rd1 to zero (i.e., R[rd1]=0?)

Less-than-zero Comparison: Determining whether value of the contents of the register specified by rs1 is less than zero (i.e., R[rs1]<0?)

Range Comparison: Determining whether the value of the contents of the register specified by rs1 is greater than or equal to an "upper range" value.

If the i-bit in the immediate bit field 212 is reset to binary value of 1b'0', the contents of the register specified by rs2 is used as the upper range value in the Range Comparison. In such case, the Range Comparison is: "R[rs1]≧R[rs2]?". Otherwise, when the i-bit is set to a binary value of 1b'1', then a sign-extended immediate value, simm7, is used as the range value in the Range Comparison. In such case, the Range Comparison is: "R[rs1]≧simm7?".

The Range Comparison may be summarized as follows:
If i-bit=0, R[rs1]≧R[rs2]?
If i-bit=1, R[rs1]≧simm7?.

If any of the Comparisons performed by an extension of the BNDCHK instruction evaluates to "true", then a trap is generated. Otherwise, execution of the instruction stream continues, much as if a NOP instruction had been executed. That is, the program-visible machine state is not altered if a BNDCHK instruction does not generate a trap, except that the values in the current and next program counter registers are incremented.

In a first extension of the BNDCHK instruction, the Zero Compare, the Less-than-zero Comparison, and the Range Comparisons are performed, and a trap is generated if any of the three Comparisons evaluate to true. The first extension is particularly useful when performing accelerated bound checking for array accesses, discussed in further detail below.

A second extension of the BNDCHK instruction performs the Less-than-zero Comparison and the Range Comparison (but not the Zero-Compare). This second extension is particularly useful when execution of the instruction stream should proceed without trapping as long a particular number (i.e., the contents of R[rs1 ]) is within a certain range. The second extension generates a trap when the value of the contents of R[rs1] is less than zero OR greater than or equal to the upper range value.

A third extension of the BNDCHK instruction performs the Zero Compare and the Less-than-zero Comparison (but not the Range Comparison). This third extension is useful for performing a less robust array bound checking function. In the context of array accesses, the third extension of BNDCHK will generate a trap when the value of R[rd] is zero, indicating a null pointer as the base address for the array, OR when the value of R[rs1] is less than zero, indicating an invalid array index value.

Figure 3:
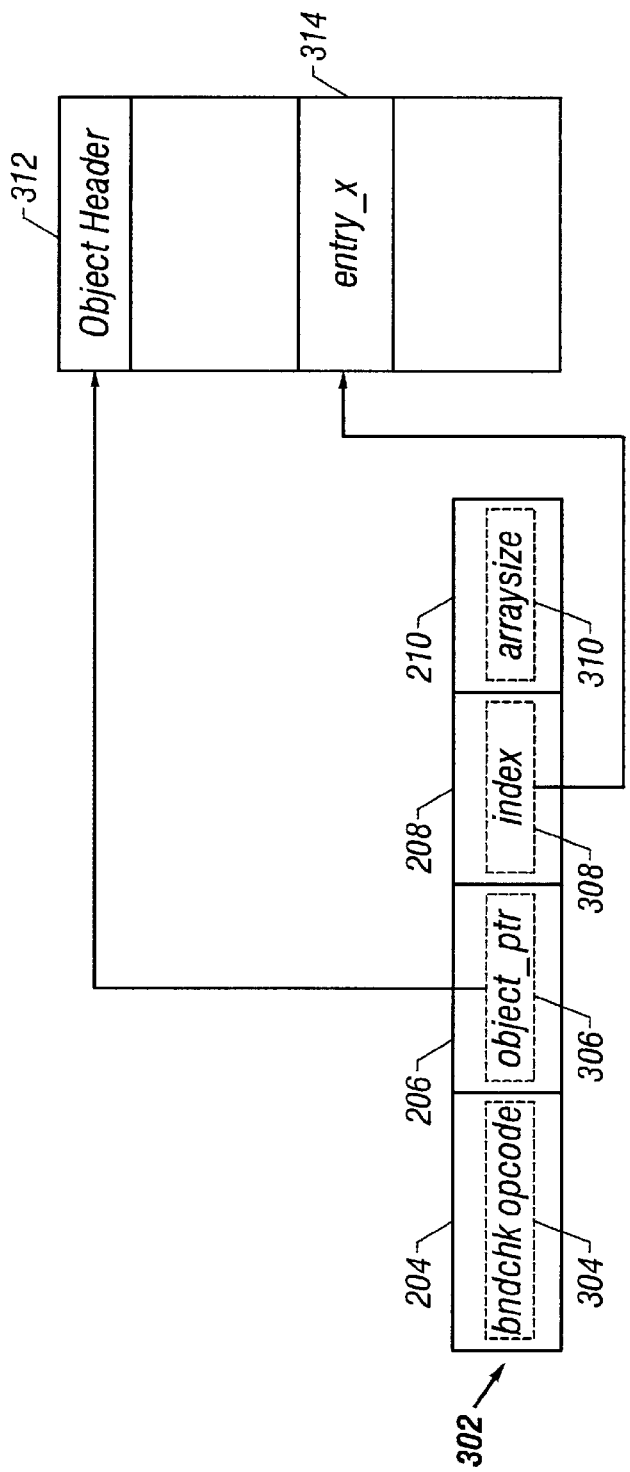
FIG. 3 is a functional diagram of the operation of the boundary check instruction of FIG. 2 in accordance with one embodiment of the present invention.

FIG. 3 is a functional diagram of one embodiment of the operation of the boundary check instruction. In particular, FIG. 3 illustrates the operation of the first extension of the BNDCHK instruction, wherein the Zero-Compare, Less-than-zero, and Range Comparisons are performed. The discussion of FIG. 3 will assume, for ease of discussion, that the BNDCHK instruction illustrated in FIG. 3 is being used to perform accelerated bound checking for an array access. One skilled in the art will recognize that the second and third extensions of the BNDCHK instruction implement only selected portions of the functionality discussed herein, and that any of the extensions may be used for bound-checking in contexts other than array accesses.

In at least one embodiment, the boundary check instruction ("BNDCHK") is implemented in a microprocessor that performs array operations. BNDCHK accelerates a check of the validity of an array access by eliminating two (second and third extensions) or three (first extension) conditional branches for valid array accesses. The boundary check instruction can be used in a computing environment in which security features like checking the validity of an array access prior to performing the array access are desired, such as in a Java™ computing environment.

Memory accesses to arrays are typically very slow for compiled Java™ code executing on a typical microprocessor, which is due to the bounds and type checks that are performed while accessing arrays. Even with advanced compiler optimizations, it is difficult to eliminate all such checks. Just In Time (JIT) Java™ compilers currently generate several checks and several conditional branches per array access for a typical Reduced Instruction Set Computing (RISC) microprocessor, which is costly from a performance standpoint.

The present invention solves this problem by providing a boundary check instruction that can be used, in the context of array bound-checking, to perform various combinations of the following comparisons:

Compare the base address of the subject array with zero
Determine whether the index offset is less than zero, and
Determine whether the index offset is greater than N−1, where N is the size of the array.

If any of these conditions checked by the boundary check instruction are met, then the boundary check instruction automatically traps. Otherwise, execution continues uninterrupted. The first extension of the boundary check operation eliminates three conditional branches for an array access and therefore allows for better code motion through the microprocessor.

FIG. 3 illustrates that BNDCHK 302, which includes opcode 304, is a control flow instruction that causes a trap if any of the Comparisons evaluates to true. Regarding the Zero Compare, the BNDCHK instruction 302 causes a trap if the value in the register specified by rd 206, is equal zero. FIG. 3 illustrates that, when the BNDCHK instruction is used to perform boundary check acceleration for array accesses, the register specified in the rd field 206 contains the array object pointer 306. Accordingly, the BNDCHK instruction traps if the array object pointer 306 is null (i.e., equal to zero) and therefore does not point to a valid array address.

Regarding the Less-than-zero Comparison, the BNDCHK instruction also causes a trap if the value residing in the register specified by the rs1 field 208 is less than zero. When using the BNDCHK instruction to perform boundary check acceleration for array accesses, R[rs1] contains the array index offset 308 for target array entry 314 of array 312. Accordingly, the BNDCHK instruction causes a trap if the value of the array index offset 308 is less than zero and therefore represents an invalid index value.

Regarding the Range Comparison, the BNDCHK instruction 302 also causes a trap if the array index offset value 308 is greater than or equal to the upper range value 310. As is described above, the upper range value resides in the register specified by the range-operand specifier (rs2) in the third register/immediate specifier field 210 when the i-bit is reset. When the i-bit is set, the upper range value is the immediate value simm7 residing in the third register/immediate specifier field 210. When the BNDCHK instruction 302 is used to perform boundary check acceleration for array accesses, the upper range value 310 is the number of array entries (N) in array 312. In order for a valid array access to occur, the array index offset value 308 must be less than N, assuming that the initial array entry has an index offset value of zero.

Figure 4:
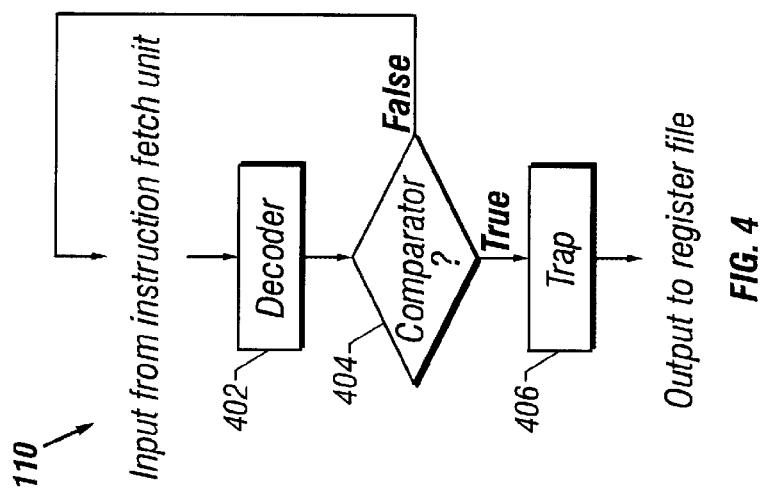
FIG. 4 is a block diagram of an implementation of the boundary check instruction of FIG. 2 in accordance with one embodiment of the present invention.

FIG. 4 is a block diagram of an implementation of the boundary check instruction 302 of FIG. 3 in accordance with one embodiment of the present invention. One skilled in the art will recognize that the implementation described herein may be effected in any known manner, including hardware modules and software modules. In particular, FIG. 4 shows MPU1 110 of FIG. 1 in greater detail. MPU1 110 includes a decoder 402 that receives an input instruction from an instruction fetch unit (not shown). Decoder 402 may be a hardware module, software module, or combination of both. Decoder 402 decodes the instruction, for example, a BNDCHK (boundary check) instruction. Decoder 402 then provides the appropriate parameter for comparisons to be performed to comparator 404.

Comparator 404 then performs the appropriate comparisons. The comparator 404 may be a hardware module, software module, or a combination of both. For the first extension of the BNDCHK instruction, the comparator 404 performs the Zero Compare, Less-than-zero Comparison, and the Range Comparison, discussed above. For the second extension of the BNDCHK instruction, comparator 404 performs the Less-than-zero Comparison and the Range Comparisons. For the third extension of the BNDCHK instruction, comparator 404 performs the Zero Compare and the Less-than-zero Comparison. If any of the comparisons evaluate to true, then a trap circuit 406 automatically traps. In one embodiment, generation of a trap terminates execution of the BNDCHK instruction. If the trap is generated, then the processor 100 (FIG. 1) starts executing a trap handler (not shown) defined for the trap. A trap handler may be implemented a computer module, sometimes referred to as a computer program, may be implemented as a hardware module, or may be implemented as a combination of both.

If none of the Comparisons evaluate to true, then no trap is performed. Execution of the instruction stream continues as if, basically, a NOP had been executed. Under RISC principles, execution of the BNDCHK instruction is relatively lightweight and is very efficient. One of ordinary skill in the art will recognize that there are various ways to implement the circuitry and logic for performing the operation of the BNDCHK instruction in a microprocessor, such as a pipelined microprocessor.

Figure 5:
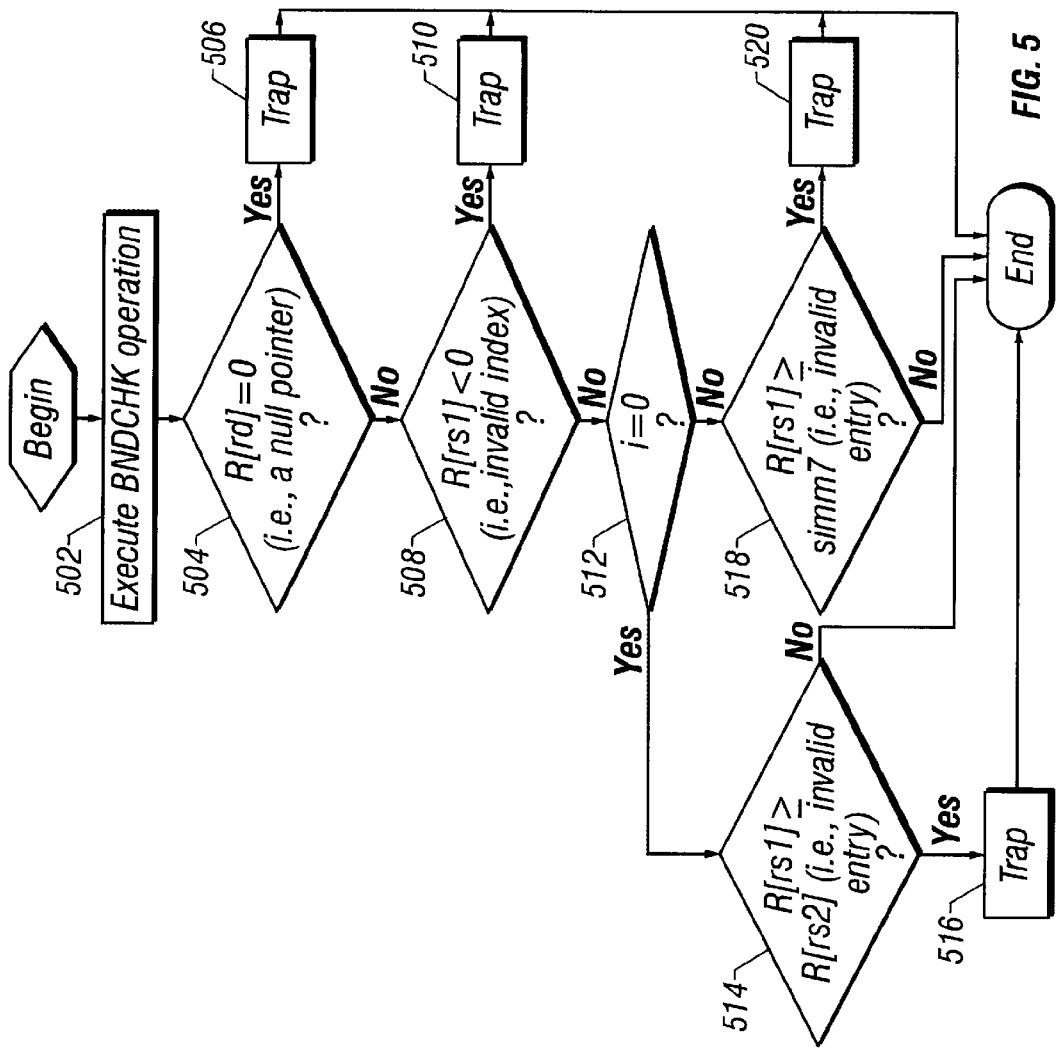
FIG. 5 is a flow diagram of the operation of the boundary check instruction of FIG. 2 in accordance with one embodiment of the present invention.

FIG. 5 is a flow diagram of the operation of the boundary check instruction 302 of FIG. 3 in accordance with one embodiment of the present invention. Execution of the BNDCHK instruction on a microprocessor begins at operation 502. At operation 504, it is determined whether R[rd] equals zero (i.e., whether the array object pointer is a null pointer). If so, a trap is performed at operation 506. Otherwise, operation proceeds to operation 508. At operation 508, it is determined whether R[rs1] is less than zero (i.e., whether the index is an invalid index). If so, a trap is performed at operation 510. Otherwise, operation proceeds to operation 512.

At operation 512, it is determined whether the upper range value to be used in the Range Comparison is an immediate value or resides in a register. Accordingly, the value of the i-bit is evaluated. If the i-bit is set, then the upper range value used in the Range Comparison performed in operation 518 is the simm7 immediate value. In operation 518, it is determined whether the value in R[rs1] is greater than simm7 (i.e., whether the index value is greater than or equal to N, where N represents the array size). If so, a trap is performed at operation 520. Otherwise, the BNDCHK instruction completes without performing a trap.

If it is instead determined in operation 512 that the i-bit is reset, the upper range value used in the Range Comparison is the contents of the register R[rs2]. Accordingly, in operation 514 it is determined whether R[rs1] is greater than R[rs2]. (i.e., whether the index is greater than or equal to N, where N represents the size of the array). If the comparison in operation 514 evaluates to true, a trap is performed at operation 516. Otherwise, operation of the BNDCHK instruction completes without performing a trap. If the BNDCHK instruction completes without performing a trap, the array access is not invalid. One skilled in the art will recognize that the Comparisons can be performed in any order with respect to each other.

In one embodiment, bndchk is an MPU operation (e.g., executed on an MPU). In one embodiment, in a multiple issue microprocessor, such as the Majc™ microprocessor, the BNDCHK instruction can be compiled to execute as a parallel instruction in a Very Long Instruction Word (VLIW) packet. For example, a VLIW packet might include the following four instructions:

sub(tract), add, bndchk[rs1, rs2, rs3], l(oa)d[rs1+rs2], rd.

The instruction pipeline of the MPU includes the following stages:

f(etch) a(lign) d(ecode) x0(execute) x1 x2 x3 t(rap) w(riteback to register file).

The BNDCHK instruction is completed at least by the end of the fourth execution stage (x3) (e.g., in the Majc™ microprocessor, the BNDCHK operation requires only one cycle and thus completes by the end of the first execution stage (x0)). If the BNDCHK operation determines that any of the Comparisons evaluate to true, then the BNDCHK operation results in a trap during the t(rap) stage, which precedes the w(riteback to register file) stage. Thus, even though the l(oa)d[rs1+rs2], rd operation generally completes by the end of the fourth execution stage (x3), the results of that operation are not written back to the register file, because the trap occurs during the t(rap) stage, which precedes the w(riteback to register file) stage. In a single-issue microprocessor, the BNDCHK operation is executed prior to the array access operation (e.g., 1d[rs1+rs2], rd) thereby assuring that a trap occurs if necessary prior to the array access operation.

Although particular embodiments of the present invention have been shown and described, it will be obvious to those skilled in the art that changes and modifications can be made without departing from the present invention in its broader aspects. For example, the present invention is not limited by any particular processor architecture, the presence or structure of caches or memory, or the number of bits in any register or memory location. The appended claims are to encompass within their scope all such changes and modifications that fall within the true scope of the present invention.

What is claimed is:

1. An apparatus that performs for boundary check acceleration, comprising:

means for executing a boundary check instruction, (to facilitate boundary check acceleration) the boundary check instruction including an opcode and also including a less-than-zero specifier, the less-than-zero specifier indicating the location of a less-than-zero operand;

wherein means for executing the boundary check instruction further comprises means for performing a less-than-zero comparison wherein it is determined whether the less-than-zero operand is less than zero; and wherein means for executing the boundary check instruction further comprises one or more additional means for performing the plurality of additional means for performing comparison, including:

means for determining whether a zero-compare operand is equal to zero; and means for determining whether the value of the less-than-zero operand is greater than or equal to the value of an upper-range operand.

2. The apparatus of claim 1, further comprising:
means for decoding the boundary check instruction.

3. The apparatus of claim 1, further comprising:
means for generating a trap if the value of the less-than-zero operand is less than zero.

4. The apparatus of claim 1 wherein the less-than-zero operand comprises a base address of an array.

5. The apparatus of claim 1 wherein:
the opcode includes an immediate bit;
the boundary check instruction further includes means for indicating, if the immediate bit is in a first state, the location of the upper-range operand, and means for indicating if the immediate bit is in a second state, the upper-range operand; and
the one or more additional means further comprises means for determining whether the less-than-zero operand is greater than or equal to the value of upper-range operand.

6. The apparatus of claim 5 wherein the upper-range operand comprises, if the immediate bit is in the second state, an immediate value.

7. The apparatus of claim 5 wherein the second state comprises a logic-high state.

8. The apparatus of claim 5 further comprising:
means for decoding the boundary check instruction.

9. The apparatus of claim 5 wherein:
the value of the upper-range operand indicates the size of an array; and the less-than-zero operand comprises an index offset for an entry in the array.

10. The apparatus of claim 5 further comprising:
means for generating a trap if the value of the less-than-zero operand is less than zero.

11. The apparatus of claim 5 further comprising:
means for generating a trap if the value of the less-than-zero operand is greater than or equal to the value of the upper-range operand.

12. The apparatus of claim 1 wherein:
the boundary check instruction further includes a zero-compare specifier, the zero-compare specifier identifying the location of the zero-compare operand; and
the one or more additional means comprises means for determining whether the zero-compare operand is equal to zero.

13. The apparatus of claim 12 further comprising:
means for generating a trap if the value of the zero-compare operand is equal to zero.

14. The apparatus of claim 12 further comprising:
means for decoding the boundary check instruction.

15. The apparatus of claim 12 further comprising:
means for generating a trap if the value of the less-than-zero operand is less than zero.

16. The apparatus of claim 12 wherein:
the zero-compare operand comprises a base address of an array; and
the less-than-zero operand comprises an index offset for an entry in the array.

17. The apparatus of claim 5 wherein:
the boundary check instruction further includes means for identifying the location of the zero-compare operand; and
the one or more additional means further comprises means for determining whether the less-than-zero operand is greater than or equal to the value of the upper-range operand and means for determining whether the value of the less-than-zero operand is greater than or equal to the value of the upper-range operand.

18. The apparatus of claim 17 wherein the upper-range operand comprises, if the immediate bit is in the second state, an immediate value.

19. The apparatus of claim 17, further comprising:
means for decoding the boundary check instruction.

20. The apparatus of claim 17, further comprising:
means for generating a trap if the value of the less-than-zero operand is less than zero.

21. The apparatus of claim 17, further comprising:
means for generating a trap if the value of the zero-compare operand is equal to zero.

22. The apparatus of claim 17, further comprising:
means for generating a trap if the value of the less-than-zero operand is greater than or equal to the value of the upper-range operand.

23. The apparatus of claim 17, wherein:
the zero-compare operand comprises a base address of an array;
the less-than-zero operand comprises an index offset for an entry in the array; and
the value of the upper-range operand indicates the size of the array.

24. An apparatus that executes a boundary check instruction including a less-than-zero specifier configured to indicate a location of a less-than-zero operand, the apparatus comprising:

a comparator configured to perform a less-than-zero comparison whereby it is determined whether the less-than-zero operand is less than zero;

the comparator further being configured to perform one or more additional comparisons from a set of:

a zero-compare comparison whereby it is determined whether a zero-compare operand is equal to zero; and a range comparison whereby it is determined whether the value of the less-than-zero operand is greater than or equal to the value of an upper-range operand.

25. The apparatus of claim 24, further comprising:

a trap module coupled to the comparator, the trap module being configured to generate a trap if the value of the less-than-zero operand is less than zero.

26. The apparatus of claim 24 wherein the less-than-zero operand comprises a base address of an array.

27. The apparatus of claim 24 wherein: the boundary check instruction further being configured to include an opcode including an immediate bit;

an upper-range specifier, the upper-range specifier being configured to indicate, if the immediate bit is in a first state, the location of the upper-range operand, the upper-range specifier being configured to indicate, if the immediate bit is in a second state, the upper-range operand.

28. The apparatus of claim 27 wherein the upper-range operand is configured to comprise, if the immediate bit is in the second state, an immediate value.

29. The apparatus of claim 27 wherein the second state comprises a logic-high state.

30. The apparatus of claim 27 wherein:

the value of the upper-range operand indicates the size of an array; and the less-than-zero operand comprises an index offset for an entry in the array.

31. The apparatus of claim 27 further comprising:

a trap module coupled to the comparator, the trap module being configured to generate a trap if the value of the less-than-zero operand is less than zero.

32. The apparatus of claim 27 further comprising:

a trap module coupled to the comparator, the trap module being configured to generate a trap if the value of the less-than-zero operand is greater than or equal to the value of the upper-range operand.

33. The apparatus of claim 24 wherein:

the boundary check instruction is further configured to include a zero-compare specifier, the zero-compare specifier being configured to identify the location of the zero-compare operand; and the comparator further being configured to perform the zero-compare comparison.

34. The apparatus of claim 33 further comprising:

a trap module coupled to the comparator, the trap module being configured to generate a trap if the value of the zero-compare operand is equal to zero.

35. The apparatus of claim 33 further comprising:

a trap module coupled to the comparator, the trap module being configured to generate a trap if the value of the less-than-zero operand is less than zero.

36. The apparatus of claim 33 wherein:

the zero-compare operand comprises a base address of an array; and the less-than-zero operand comprises an index offset for an entry in the array.

37. The apparatus of claim 27 wherein:

the boundary check instruction is further configured to include a zero-compare specifier, the zero-compare specifier being configured to identify the location of the zero-compare operand; and the comparator further being configured to perform the zero-compare comparison and the range comparison.

38. The apparatus of claim 37 wherein the upper-range operand being configured to comprise, if the immediate bit is in the second state, an immediate value.

39. The apparatus of claim 37 wherein the second state comprises a logic-high state.

40. The apparatus of claim 37, further comprising:

a trap module coupled to the comparator, the trap module being configured to generate a trap if the value of the less-than-zero operand is less than zero.

41. The apparatus of claim 37, further comprising:

a trap module coupled to the comparator, the trap module being configured to generate a trap if the value of the zero-compare operand is equal to zero.

42. The apparatus of claim 37, further comprising:

a trap module coupled to the comparator, the trap module being configured to generate a trap if the value of the less-than-zero operand is greater than or equal to the value of the upper-range operand.

43. The apparatus of claim 37, wherein:

the zero-compare operand comprises a base address of an array;

the less-than-zero operand comprises an index offset for an entry in the array; and the value of the upper-range operand indicates the size of the array.

* * * * *